(12) United States Patent
Taylor et al.

(10) Patent No.: US 8,461,244 B2
(45) Date of Patent: Jun. 11, 2013

(54) INTUMESCENT COATING COMPOSITIONS

(75) Inventors: Andrew Philip Taylor, Lancashire (GB); Simon Butterfield, Lancashire (GB); John Darryl Green, Lancashire (GB); William Allen, Lancashire (GB)

(73) Assignee: W. & J. Leigh & Co., Bolton, Lancashire (GB)

(*) Notice: Subject to any disclaimer, the term of this patent is extended or adjusted under 35 U.S.C. 154(b) by 40 days.

(21) Appl. No.: 11/722,347

(22) PCT Filed: Dec. 21, 2005

(86) PCT No.: PCT/GB2005/005025
§ 371 (c)(1),
(2), (4) Date: Feb. 4, 2009

(87) PCT Pub. No.: WO2006/067478
PCT Pub. Date: Jun. 29, 2006

(65) Prior Publication Data
US 2009/0143501 A1   Jun. 4, 2009

(51) Int. Cl.
*C08K 3/34* (2006.01)
(52) U.S. Cl.
USPC ............ 524/444; 524/450; 523/179; 252/606

(58) Field of Classification Search
USPC .................... 252/606; 523/179; 524/444, 450
See application file for complete search history.

(56) References Cited

U.S. PATENT DOCUMENTS

| | | | |
|---|---|---|---|
| 4,144,385 A * | 3/1979 | Downing et al. | 521/95 |
| 4,743,625 A | 5/1988 | Vajs et al. | |
| 5,721,281 A | 2/1998 | Blount | |
| 6,235,658 B1 | 5/2001 | Panzer et al. | |
| 6,251,995 B1 | 6/2001 | Hesse et al. | |
| 2008/0224105 A1 * | 9/2008 | Green et al. | 252/606 |

FOREIGN PATENT DOCUMENTS

| | | |
|---|---|---|
| WO | 02096996 A1 | 12/2002 |
| WO | 03085039 A1 | 10/2003 |

* cited by examiner

*Primary Examiner* — Kriellion Sanders
(74) *Attorney, Agent, or Firm* — Barlow, Josephs & Holmes, Ltd.

(57) ABSTRACT

A liquid intumescent resin coating composition including at least one polymeric component, at least one ethylenically unsaturated monomeric component, and at least one intumescent ingredient. The coating composition further includes at least one of Sodium Potassium Aluminum Silicate (Nepheline syenite) and Potassium Aluminum Silicate. The coating composition is curable to a solid state by free radical polymerization.

16 Claims, No Drawings

INTUMESCENT COATING COMPOSITIONS

The present invention relates to liquid intumescent coating compositions that have particular, but not exclusive, application in protecting steel structures in a fire situation.

Intumescent coating compositions are commonly used to protect structural steel components in buildings (or any other steel supported structure) against the effects of any fire conditions known to the art including cellulosic, hydrocarbon and/or Jetfire conditions. They contain a resin system "pigmented" with various intumescent ingredients that under the influence of heat, react together to produce an insulating foam or "char", having low thermal conductivity, which has a volume many times that of the original coating. This char greatly reduces the rate of heating experienced by the steel, thus extending the time before the steel loses its integrity and the building/structure collapses, thereby allowing additional time for safe evacuation.

During a fire situation, a steel structure will heat up, the rate of heating depending on the specific dimensions of the steel sections used in the structure. The rate of heating is dependent on the Hp/A value of the section, where Hp is the perimeter of the steel when viewed in cross-section, and A is the cross-sectional area.

A steel section with a large perimeter (Hp) will receive more heat than one with a smaller perimeter. On the other hand, the greater the cross-sectional area (A), the more heat the steel section can absorb. Thus, a large thin steel section having a high Hp/A value will heat up more quickly than a small thick section having a lower Hp/A value.

The thickness of the coating that is applied depends on the Hp/A value of the steel, its configuration, and the level of fire protection required. The latter is typically specified from 30 minutes to 120 minutes, this being the time taken for the steel to reach its critical failure temperature (550° C.) under standard test conditions. It should be noted that variations do occur in failure temperature criteria, for example, if the steel section is in a horizontal plane (beam) opposed to a vertical plane (column) then the failure temperature is usually higher (around 620° C. compared to 550°). Also, different failure criteria exist depending on the test procedure being used, for example if a hydrocarbon fire situation is being evaluated, commonly an extra safety margin is built in and a failure temperature of 400° C. is used.

Typically the dry film thickness of intumescent coating applied varies from 250 μm to several millimeters, depending on the level of fire protection required. With solvent based or water based prior art intumescent coatings, the higher dry film thicknesses can only be achieved by the application of multiple coats.

Prior art intumescent coatings designed for cellulosic fire protection tend to be based on high molecular weight thermoplastic resins based on acrylate, methacrylate and/or vinyl chemistry and require a high proportion of organic solvent or water to facilitate application to the substrate to be fire protected. This leads to slow and often protracted drying times, especially when high wet film thicknesses are applied (up to 2 mm per coat), since the rate of drying is dependent on the evaporation of the carrier solvent. Increasingly stringent legislation concerning organic solvent emissions has meant greater use of water based products but slow drying remains a problem, particularly when the relative humidity is high.

Where multiple coats are required the problems of slow drying are exacerbated, particularly with solvent based coatings, where solvent from subsequent coats can strike back into the previous coats.

The use of ovens or near infra-red heaters can reduce the drying times, though these are expensive to operate, and due to the thermoplastic nature of the coatings, cooling is necessary prior to handling in order to prevent damage. Cooling of thick heavy steel sections, can take a relatively long time.

Prior art intumescent coatings designed for hydrocarbon and Jetfire fire scenarios have tended to be 100% solids (i.e. no volatiles present) and based on epoxy resin systems, giving rise to high viscosity mastic type coatings. The epoxy binder system of this type of coating provides excellent durability to adverse weather conditions and also, its thermoset resin backbone gives rise to a very dense, hard intumescent char which is ideally suited to give steel protection from the hotter, harsher more turbulent hydrocarbon and jetfire fires.

Unfortunately, the high viscosity of mastic type coatings of the above type tends to lead to difficulties to apply the coatings by conventional methods, with sophisticated plural component spray systems usually being required. Also significantly higher film thicknesses of said coatings tend to be required to insulate steel to hydrocarbon fires compared to their cellulosic equivalents, typically up to 30 times higher thickness of epoxy based mastic intumescent can be required to protect, for example, a steel column for 60 minutes hydrocarbon fire, compared to a cellulosic product in a cellulosic fire. Prior art hydrocarbon fire protection products also tend to require the incorporation of some form of reinforcement sandwiched between coats of the product. This reinforcement usually takes the form of a metal or synthetic mesh or cloth, and is required to enhance the performance of the intumescent char in a fire. All of the above has meant that hydrocarbon fire protection of steel structures has tended to be significantly more expensive than cellulosic fire protection for the same time periods.

Jetfire scenarios have an even greater destructive erosive effect than hydrocarbon fires. For this reason, char integrity becomes all important. A state of the art cellulosic fire protection system expands typically to 25-100 times its original volume forming a weak fluffy char that is easily destroyed by jetfire conditions. State of the art hydrocarbon/Jetfire fire materials expand by a factor of typically 2-8 times thus forming a tougher harder char that is more able to cope with the erosive nature of jetfire.

Traditionally, intumescent coatings were applied on-site to steel structures during the construction phase of the building. More recently in-shop application has become more common practice, as better control of application conditions is possible. Slow drying means that throughput is compromised, as coated steel sections cannot be moved until they are hard enough to resist damage.

The present invention seeks to provide a relatively quick-drying intumescent coating formulation.

According to a first aspect of the present invention there is provided a liquid intumescent coating composition comprising a resin system comprising at least one polymeric component; at least one ethylenically unsaturated monomeric component, and at least one intumescent ingredient, the coating composition being curable to a solid state by free radical polymerisation, and the coating composition further comprising at least one of Sodium Potassium Aluminium, Silicate (Nepheline syenite) and Potassium Aluminium Silicate.

According to a second aspect of the present invention there is provided a method of curing a liquid intumescent coating composition to a solid state by free radical polymerisation comprising the step of adding an initiator to the liquid intumescent coating composition, wherein the coating composition comprises at least one polymeric component, at least one ethylenically unsaturated monomeric component and at least one intumescent ingredient, and the coating composition further comprising at least one of Sodium Potassium, Silicate (Nepheline syenite) and Potassium Aluminium Silicate.

The coating composition of the invention, in one preferred embodiment, has a viscosity in the range from 10 poise to 80 poise measured on a Brookfield Viscometer at 20 degrees Celsius, (but still retaining 100% or close to 100% non volatile content), hence facilitating easier application than current existing hydrocarbon fire protection.

The coating of the invention generally requires significantly lower film thicknesses of coating (compared to current existing products) to provide the same duration of hydrocarbon fire protection. This not only reduces the cost per unit area of hydrocarbon fire protection, but also significantly reduces the weight of coating required and hence reduces the weight that the steel structure has to bear. Typical coating thicknesses would be in the range from 0.25 mm to 20 mm.

The coatings of the invention are generally converted to a solid state significantly quicker than existing prior art hydrocarbon fire protection coatings, particularly at lower temperatures, for example below 10° C., where prior art epoxy type coatings suffer from severe retardation of cure time, but the present invention does not. Typically this conversion takes from 20-40 minutes at 25° Celsius to 1-4 hours at 5-10° Celsius.

The compositions of the invention generally have reduced or no requirement for a reinforcement mesh or cloth within layers of the coating, although such reinforcement may be used.

It is noted that the liquid intumescent coating composition may comprise one or more solid components.

The invention provides a quick-drying coating composition in that the initiator initiates the conversion of the intumescent coating composition into a solid state via a free-radical polymerisation reaction. No organic solvent or water is provided or is necessary to reduce the viscosity in order to facilitate application of the coating as this is facilitated by the use of the reactive monomer. The fact that the coating dries by free radical polymerisation, as opposed to solvent evaporation also has the added benefit of giving rise to much higher "solids" content of the coating, i.e. typically 95-100% by weight of the applied wet coating becomes dry coating on the substrate, compared to typical prior art cellulosic coatings where only 60-80% of the applied film thickness remains in the dry film.

The coating has particular, but not exclusive application in the coating of steel structures to provide protection against fire by forming an intumescent and insulating char. These coatings are suitable for both on-site and in-shop application.

Steel sections and other materials that are coated with such an intumescent coating composition harden much more rapidly than prior art materials, since the drying time is dependent on the relatively rapid free-radical chemical reactions rather than on complete evaporation of volatile components, or chemical curing of an epoxy system. Drying times are reduced from 24 hours or longer, to around 60 minutes, (or even less with the incorporation of additional accelerator). This provides significant benefits to in-shop applicators, and enables a continuous process of application, drying and removal of steel sections from the application area.

Another benefit is that thick films can be applied in a single coat application, further reducing drying times compared with multiple coats of prior art intumescent coatings.

The present invention utilises free radical cure and comprises at least one solid thermoplastic polymeric resin component, combined with lower molecular weight liquid monomeric (or oligomeric components) containing ethylenically unsaturated double bonds. Preferably the ethylenically unsaturated double bonds are present as alpha-beta ethylenically unsaturated carboxylate ester groups such as methacrylate or acrylate groups.

The solid thermoplastic polymer is preferably a (meth) acrylic resin, either as a homopolymer, copolymer or terpolymer. The polymeric component ideally comprises a meth (acrylate) copolymer. This may be produced from the polymerisation of one or more methacrylate and acrylate monomers, such as any of the following:—methyl methacrylate, ethyl methacrylate, n-butyl methacrylate, isobutyl methacrylate, t-butyl methacrylate, 2-hydroxy ethyl methacrylate, 2-hydroxy propyl methacrylate, 2-ethylhexyl methacrylate and the corresponding acrylates. Co-reactants may include styrene and vinyl toluene. The preferred solid thermoplastic polymer is a copolymer of butyl methacrylate and methyl methacrylate.

Other options for the solid thermoplastic polymeric resin component include homopolymers, copolymers or terpolymers derived from vinyl monomers such as any of the following:—styrene, vinyl toluene, vinyl chloride, vinyl acetate, vinylidine chloride and vinyl versatate esters. Co-reactants may include dienes such as butadiene.

The solid thermoplastic resin preferably constitutes from 10% to 50% by weight of the resin components of the coating composition.

At least one of the liquid monomeric components preferably contains methacrylate functionality, and most preferably are methacrylic acid esters. Optionally at least one of the monomeric components contains acrylate functionality, and most preferably comprise acrylic acid esters. Additionally the monomeric components should preferably be monofunctional, in order that the resultant polymer produced on reaction with an organic peroxide is thermoplastic and thus melts and flows prior to temperatures at which the intumescent ingredients react.

Examples of suitable methacrylic acid esters and acrylic acid esters include any of the following either alone or in combination:—methyl methacrylate, ethyl methacrylate, n-butyl methacrylate, isobutyl methacrylate t-butyl methacrylate, 2-ethylhexyl methacrylate, and the corresponding acrylates. Methyl methacrylate is most preferred methacrylate acid ester due to its ability to produce low viscosity solutions of the solid thermoplastic resin component and its high glass transition temperature. However, its high volatility and characteristic odour, may for certain applications mean that alternative methacrylate acid esters may be preferable. The most preferred acrylic acid ester is 2-ethylhexyl acrylate.

The liquid monomeric components preferably constitute from 30% to 100% by weight of the resin components of the coating composition.

Proprietary resin solutions containing both the aforementioned solid resin and liquid monomers may also contain oligimeric components.

The total resin components ideally constitute from 20% to 60% of the coating composition. More preferably the total resin components constitute from 25% to 50% of the coating composition.

One or more initiators are added prior to use to convert the liquid coating to a solid state on the substrate. These are required to initiate the free-radical curing mechanism necessary to convert the monomeric (and oligomeric) components to a solid state. The initiators may be AZO compounds, but are preferably one or more organic peroxides. Suitable classes of organic peroxides include any of the following either alone or in combination:—diacyl peroxides, ketone peroxides, peroxyesters, dialkyl peroxides, hydroperoxides and peroxyketals.

Diacyl peroxides are preferred, the most preferred peroxide in this class being dibenzoyl peroxide, which may be used in its solid granular form, or as a paste with plasticiser. The preferred form of use is as a paste.

The organic peroxide composition content is determined by the total resin content, and preferably constitutes from 0.5% to 5% of the total resin content. More preferably the organic peroxide composition constitutes from 1% to 4% of the total resin content. Note that these figures are based on weight of peroxide proprietary blend as supplied, containing 50% peroxide as active ingredient.

Where dibenzoyl peroxide is used as an initiator, a tertiary amine is preferably added to the coating compositions to accelerate the rate of cure, thus allowing the pot-life and curing time to be optimised. Aromatic tertiary amines are preferred, suitable examples include any of tire following:—N,N-dimethylaniline and N,N-dialkyl-p-toluidine compounds such as N,N-dimethyl-p-toluidine, N,N-bis-(2-hydroxypropyl)-p-toluidine and N,methyl-n-hydroxyethyl-p-toluidine. The most preferred aromatic tertiary amine accelerators are N,N-dimethyl-p-toluidine. and N,N-bis-(2-hydroxypropyl)-p-toluidine.

The tertiary amine content is determined by the total resin content, and ideally constitutes from 0.1% to 4% of the total resin content. More preferably the tertiary amine constitutes from 0.25% to 3% of the total resin content.

Where an AZO initiator is to be used, the preferred initiators include any of the following either alone or in combination:—2,2-azobis(-amidinopropane)dihydrochloride, 2,2-azobis(2-methylbutyronitrile), 2,2-azobis(2-methylpropanenitrile), 2,2-azobis(2,4-dimethylpentanenitrile). These are available from Dupont under the trade name of Vazo.

The intumescent coating compositions of the present invention also contain specific ingredients that react together under the influence of heat from a fire, to form a protective insulating foam or char. These ingredients should be of low solubility to ensure that the coating has an acceptable level of durability, and maintains its integrity throughout the service life of the coating. Additionally, the intumescent ingredients used should have a sufficiently small particle size, in order to obtain satisfactory dispersion in the resin components, and thus allow application by spray application methods giving high rates of transfer of the coating to the substrate.

The intumescent ingredients preferably consist of three components, an acid source, a carbon source and a spumific or gas source. Preferably an inorganic "nucleating agent" should be present and optionally additives, which may be solid or liquid in nature, may be added to aid char formation and strengthen the char.

Under the influence of heat (between 100° C. and 200° C.) the resin components melt and begin to flow. As the temperature increases (>200° C.) the acid source, usually by decomposition, produces copious amounts of acid which can react with other constituents in the coating. If the acid source is ammonium polyphosphate, polyphosphoric acids are released which can react with polyhydric alcohols such as pentaerythritol (carbon source) to form polyphosphoric acid esters. The decomposition of these esters leads to the formation of carbon compounds, which together with a blowing agent such as melamine, give rise to a carbon foam or char.

The intumescent coating compositions of the present invention ideally contain at least one acid source, examples of which include ammonium polyphosphate, melamine phosphate, magnesium sulphate and boric acid. The preferred acid source is ammonium polyphosphate.

Ammonium polyphosphate can vary in molecular weight (chain length), the lower the molecular weight, the higher the solubility. By having very high molecular weight and a cross-linked structure it is possible to have very low water solubility, though higher thermal stability is observed. Coating ammonium polyphosphate with silane, melamine or melamine formaldehyde is beneficial in further reducing solubility and can also lead to higher loadings due to a reduction in resin absorbing properties. The use of coated ammonium polyphosphate is preferred, and ammonium polyphosphate coated with melamine formaldehyde is most preferred.

The acid source preferably constitutes from 35% to 65% by weight of the intumescent ingredients content of the coating composition.

The intumescent coating compositions of the present invention ideally contain at least one carbon source, examples of which include polyhydric alcohols such as pentaerythritol, and dipentaerythritol. Starch and expandable graphite are other possible carbon sources. The preferred carbon sources are pentaerythritol and dipentaerythritol or a combination of the two.

The carbon source preferably constitutes from 5% to 40% by weight of the intumescent ingredients content of the coating composition.

The intumescent coating compositions of the present invention ideally contain at least one gas source, examples of which include any of:—melamine, melamine phosphate, melamine borate, melamine formaldehyde, melamine cyanurate, tris-(hydroxyethyl) isocyanurate (THEIC), ammonium polyphosphate or chlorinated paraffin. The resin itself may be a gas source as it undergoes decomposition. The preferred gas source is melamine.

The gas source preferably constitutes from 5% to 40% by weight of the intumescent ingredients content of the coating composition.

Although not an essential ingredient in intumescent reactions, inorganic "nucleating" agents are a preferred ingredient since they promote sites for the intumescent char to form, improve the thermal resistance properties and stability of the intumescent char during a fire. The intumescent coating compositions of the present invention ideally contain at least one nucleating agent in addition to the nucleating agent comprising at least one of sodium potassium aluminium silicate (nepheline syenite), potassium aluminium silicate (mica), examples of which include titanium dioxide, zinc oxide, aluminium oxide, silica, fumed silica silicates such as magnesium silicate, potassium silicate, sodium silicate, calcium silicate, aluminium silicate, combinations of these five key silicates particularly; calcium magnesium silicate (talc), and zeolites (interlocking tetrahedra of $SiO_4$ and $AlO_4$, metal oxides such as cerium oxide, lanthanum oxide and zirconium oxide, mica and bentonite clay. A preferred nucleating agent is titanium dioxide which also provides opacity to the coating. Fumed Silica is also preferred, for example, in conjunction with Titanium Dioxide, the fumed silica performing the role of thixotropising/thickening agent also (see below).

The most preferred silicate is Sodium Potassium Aluminium silicate, also known as nepheline syenite The nucleating agent preferably constitutes from 1% to 25% by weight of the intumescent ingredients content of the coating composition. For hydrocarbon fire or jetfire scenarios, increased levels of nucleating agents are usually required compared to levels required for cellulosic fires, however, the required levels still lie between 1-25% by weight of the intumescent ingredients of the coating composition Further optional additives may be optionally included as part of the intumescent ingredients to aid char formation and to strengthen the char and prevent char degradation especially in jetfire scenarios. Such additives include solids such as zinc borate, zinc stannate, zinc hydroxystannate, glass flake, glass spheres, polymeric spheres, fibres (ceramic, mineral, glass/silica based), aluminium hydroxide, antimony oxide, boron phosphate, fumed silica.

The total intumescent ingredients ideally constitute from 40% to 85% of the total coating composition. More preferably the total intumescent ingredients constitute from 50% to 75% of the total coating composition.

In order that the intumescent coating compositions of the present invention can be applied at high film thickness in a single coat application it is preferred to modify the rheology of the coating by the incorporation of a thixotrope. Suitable thixotropic additives include organically modified inorganic clays such as bentonite clays, hectorite clays or attapulgite clays, organic wax thixotropes based on castor oil and fumed silica. The most preferred thixotropic additives are wax thixotropes and fumed silicas.

The thixotropic additive preferably constitutes from 0% to 2% of the total coating composition. A more preferred level is from 0.05% to 1%.

To improve or facilitate dispersion of the intumescent ingredients and also to reduce the overall viscosity of the intumescent coating, it may be necessary to incorporate wetting/dispersion additives. Such additives are usually liquid in form and can be supplied either containing a solvent or be solvent free. Where required preferably a solvent free wetting agent is used, even more preferably a wetting agent with acid functionality is recommended, at levels between 0%-2% by weight of the intumescent coating composition The components of the intumescent coating compositions, with the exception of the organic peroxide initiator, are preferably blended together by the coating manufacturer using high speed dispersion equipment, whereby the solid intumescent ingredients are wetted out and dispersed in the resin components. Optional dispersion aids may be incorporated to facilitate this process.

The thickness of the coating is ideally at least 250 µm.

Prior to application of the coating the organic peroxide is incorporated into the bulk of the liquid coating. This initiates the free radical reactions that will convert the liquid coating to its solid state. Typically, the initiated liquid coating will remain liquid and suitable for application for up to 30 minutes, though this can be modified by varying the quantities of initiator and accelerator in the formulation.

Suitable preferred methods of application of the aforesaid compositions include airless spray, brush, roller, trowel and dipping. Airless spray is most preferred. Airless spray pumps having a ratio of 45:1 or greater, and preferably 60:1 are suitable. A minimum air pressure of greater than 60 p.s.i. and preferably 80 p.s.i. is required, and the compositions are sprayed using a tip size ranging from 0.015 inch and 0.035 inch.

An alternative method of application can be by means of a plural component spray system. This can, be achieved in two ways, as set out below:—

1. The initiator (peroxide) component of the coating composition and the main (base) component are pumped separately in the correct ratio through fluid lines to a mixing device. This device mixes the two components automatically and then dispenses the mixed homogenous coating down a further fluid line to the spray tip where the coating is applied as per the above mentioned airless spray application.

2. The second method involves the initial manufacture of two batches of coating. One batch comprises a coating containing no amine accelerators, the other batch comprising a coating containing double the original level of amine accelerators. Prior to application double the original level of initiator (peroxide) is mixed with the batch containing no amine accelerators. The two components are then mixed in the fluid line by plural component spray equipment, but at a more manageable 1:1 mixing ratio (opposed to approximately 50-200:1 previously). The in-line mixed liquid coating will have the right level of amine accelerators and initiator (peroxide). In view of the lack of amine accelerators in the batch containing the peroxide, this batch has a much extended use or pot life, typically up to 24 hours thus providing sufficient time to apply all of the mixed material.

The coating compositions should be stored under cool conditions, and ideally application should only be carried out under such conditions. Where it is necessary to apply the coating compositions at higher temperatures, then modified formulations that have been adjusted for initiator or accelerator should be used.

The coating compositions of the present invention can be applied in liquid form to steel sections up to several meters in length with a gauge thickness typically ranging from 5 mm to 30 mm or greater. Depending on the Hp/A of the steel section coating can be applied at the required thickness to achieve up to 120 minutes fire protection.

Steel sections requiring fire protection are normally blast cleaned prior to the application of an intumescent coating to remove millscale and other deposits that may lead to premature failure of the intumescent coating, either on prolonged atmospheric exposure or during a fire situation. In order to prevent deterioration of the blast cleaned surface, particularly where there is a delay in applying the intumescent coating, it is normal practice to apply a primer coating. This is often the case when the intumescent coating is applied on site.

Examples of suitable primers are coatings based on epoxy, modified epoxy (such as modified with polyvinyl butyral), polyurethane, acrylic, vinyl and chlorinated rubber. Primers based on epoxy are preferred.

The thickness of the primer is ideally in the range from 15 microns to 250 microns. Preferably the thickness should be in the range from 25 microns to 100 microns.

A decorative topcoat may be applied to the cured intumescent coatings of the present invention, particularly to provide colour to exposed steelwork. A topcoat if correctly formulated will also enhance the durability of the intumescent coating compositions. A clear sealer may also be suitable.

Examples of suitable decorative topcoats are coatings based on epoxy, polyurethane, alkyd, acrylic, vinyl and chlorinated rubber. Decorative topcoats based on polyurethane and acrylic are preferred.

The thickness of the decorative topcoat can vary from 15 microns to 250 microns. Preferably the thickness should be in the range from 25 microns to 75 microns, as too high a thickness of topcoat may inhibit the intumescent reactions.

In order that the present invention may be more readily understood specific embodiments thereof will now be described by way of example only:—

EXAMPLE 1

|  | Parts by weight |
| --- | --- |
| Component A | |
| Titanium Dioxide | 10.46 |
| Fumed Silica | 0.14 |
| Pentaerythritol | 8.67 |
| Zinc Borate | 0.99 |
| Melamine | 14.48 |
| Aluminium Hydroxide | 0.49 |
| Ammonium Polyphosphate | 30.84 |
| Wetting Agent | 0.37 |
| Meth)acrylic resin | 33.56 |
| Component B | |
| Dibenzoyl Peroxide paste | 1.0 |

Component B above was mixed into component A immediately prior to application to a substrate.

EXAMPLE 2

|  | Parts by weight |
| --- | --- |
| Component A | |
| Titanium Dioxide | 10.22 |
| Fumed Silica | 0.13 |
| Pentaerythritol | 8.46 |
| Zinc Borate | 0.97 |
| Melamine | 14.13 |
| Aluminium Hydroxide | 0.48 |
| Ammonium Polyphosphate | 30.11 |
| Nepheline Syenite | 1.68 |
| Wetting Agent | 0.36 |
| Meth)acrylic resin | 33.47 |
| Component B | |
| Dibenzoyl Peroxide paste | 1.0 |

Component B above was mixed into component A immediately prior to application to a substrate.

Test 1

The above example formulations were applied by airless spray onto 2 separate I section beams having a web length of 406 mm, a flange length of 178 mm and a weight of 60 kg per meter (Hp/A for three sided orientation=175). The mean dry film thickness was measured at 6240 microns for example 1 and 5470 microns for example 2, after being allowed to condition for 5 days.

The steel section was fire-tested in an approximately $4M^3$ furnace according to BS476 Part 20, 1987. The time taken for the steel section to reach the mean Critical Failure Temperature (620° C.) was 100 minutes for example formulation 1 and 119 minutes for example formulation 2.

It is to be understood that the above described embodiment is by way of example only. Many modifications and variations are possible.

The invention claimed is:

1. A liquid intumescent coating composition, comprising:
a resin system comprising at least one polymeric component, said at least one polymeric component comprising solid thermoplastic polymer comprising a homopolymer, copolymer, or terpolymer of one or more methacrylate or acrylate monomers,
at least one ethylenically unsaturated monomeric component, and
at least one intumescent ingredient,
the coating composition being curable to a solid state by free radical polymerization, and the coating composition further comprising at least one of Nepheline syenite and Potassium Aluminum Silicate.

2. A liquid intumescent coating composition as claimed in claim 1, wherein the at least one polymeric component comprises the reaction product of at least one of styrene vinyl toluene together with at least one of any of the following: methyl methacrylate, ethyl methacrylate, n-butyl methacrylate, isobutyl methacrylate, t-butyl methacrylate, 2-hydroxy ethyl methacrylate, 2-hydroxy propyl methacrylate, 2-ethylhexyl acrylate, methyl acrylate, n-butyl acrylate, isobutyl acrylate, t-butyl acrylate, 2-hydroxy ethyl acrylate, 2-hydroxy propyl acrylate and 2-ethylhexyl acrylate.

3. A liquid intumescent coating composition as claimed in claim 1, wherein at least one polymeric component further comprises the reaction product of one or more diene together with at least one of any of the following: styrene, vinyl toluene, vinyl chloride, vinyl acetate, vinylidine chloride, and vinyl versatate esters.

4. A liquid intumescent coating composition as claimed in claim 1, wherein the ethylenically unsaturated monomeric component has at least one of a methacrylate or acrylate functionality.

5. A liquid intumescent coating composition as claimed in claim 1, wherein the ethylenically unsaturated monomeric component comprises any of the following either alone or in combination: methyl methacrylate, ethyl methacrylate, n-butyl methacrylate, isobutyl methacrylate, t-butyl methacrylate, 2-ethylhexyl methacrylate, methyl acrylate, ethyl acrylate, n-butyl acrylate, isobutyl acrylate, t-butyl acrylate and 2-ethylhexyl acrylate.

6. A liquid intumescent coating composition as claimed in claim 1, wherein said at least one intumescent ingredient comprises an acid source, a carbon source and a gas source.

7. A liquid intumescent coating composition as claimed in claim 1, wherein the composition has a viscosity in the range from 10 poise to 80 poise measured on a Brookfield Viscometer at 20 degrees Celsius.

8. A method of curing a liquid intumescent coating composition to a solid state by free radical polymerization comprising the step of adding an initiator to the liquid intumescent coating composition, wherein the coating composition comprises at least one solid, (meth)acrylic polymeric component, at least one ethylenically unsaturated monomeric component and at least one intumescent ingredient, and the coating composition further comprising at least one of Nepheline syenite and Potassium Aluminum Silicate.

9. A method as claimed in claim 8, wherein the initiator comprises organic peroxide.

10. A method as claimed in claim 9, wherein the organic peroxide comprises any of the following either alone or in combination: diacyl peroxides, ketone peroxides, peroxyesters, diakyl peroxides, hydroperoxides and peroxyketals.

11. A method as claimed in claim 8, wherein the coating composition is cured in less than 60 minutes at a temperature of 20° C.+/−3° C.

12. A method as claimed in claim 8, wherein less than 5% by weight of volatile components is lost by evaporation during the conversion of the composition to a solid state by the addition of an organic peroxide.

13. A method as claimed in claim 8, wherein the coating thickness is in the range from 0.25 mm to 20 mm.

14. A liquid intumescent coating composition as claimed in claim 1, wherein the at least one of Nepheline syenite and Potassium Aluminum Silicate are less than 5% by weight of the coating composition.

15. A liquid intumescent coating composition as claimed in claim 1, wherein the at least one of Nepheline syenite and Potassium Aluminum Silicate are 1 to 5% by weight of the coating composition.

16. An intumescent coating composition comprising:
at least one solid, thermoplastic, (meth)acrylic polymer;
at least one liquid, ethylenically unsaturated monomer;
at least one organic peroxide initiator;
at least one intumescent ingredient;
a nucleating agent selected from nepheline syenite and potassium aluminum silicate.

* * * * *